June 8, 1943.  A. TOGNETTI  2,321,168
VEHICLE LOADING AND UNLOADING DEVICE
Filed March 12, 1941  3 Sheets-Sheet 1
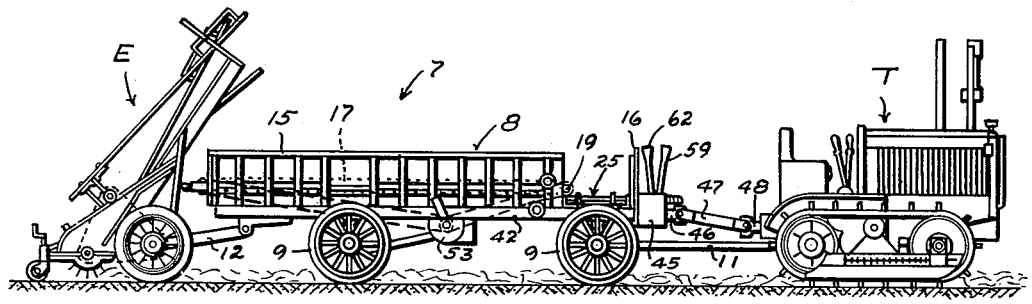
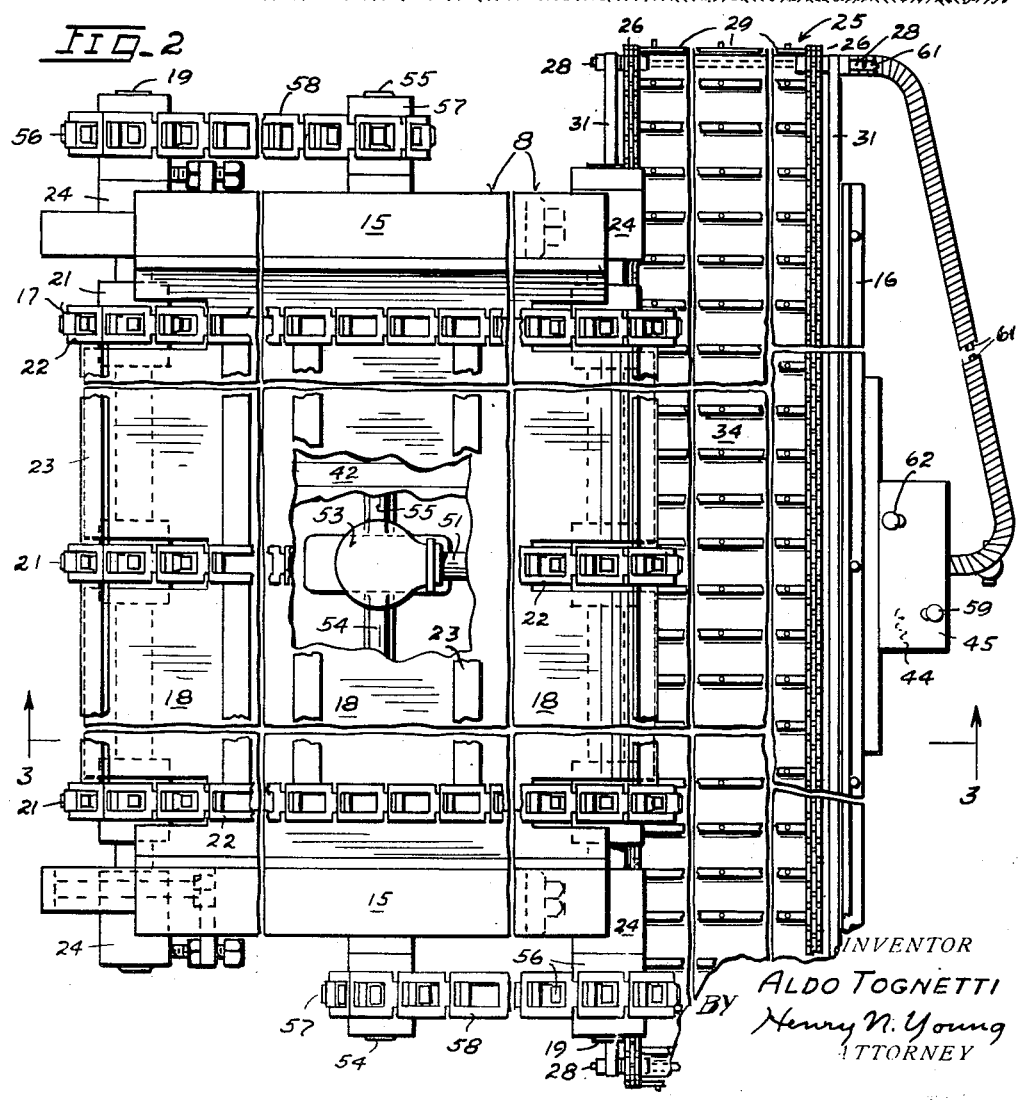
INVENTOR
ALDO TOGNETTI
BY Henry N. Young
ATTORNEY June 8, 1943. A. TOGNETTI 2,321,168
VEHICLE LOADING AND UNLOADING DEVICE
Filed March 12, 1941 3 Sheets-Sheet 2
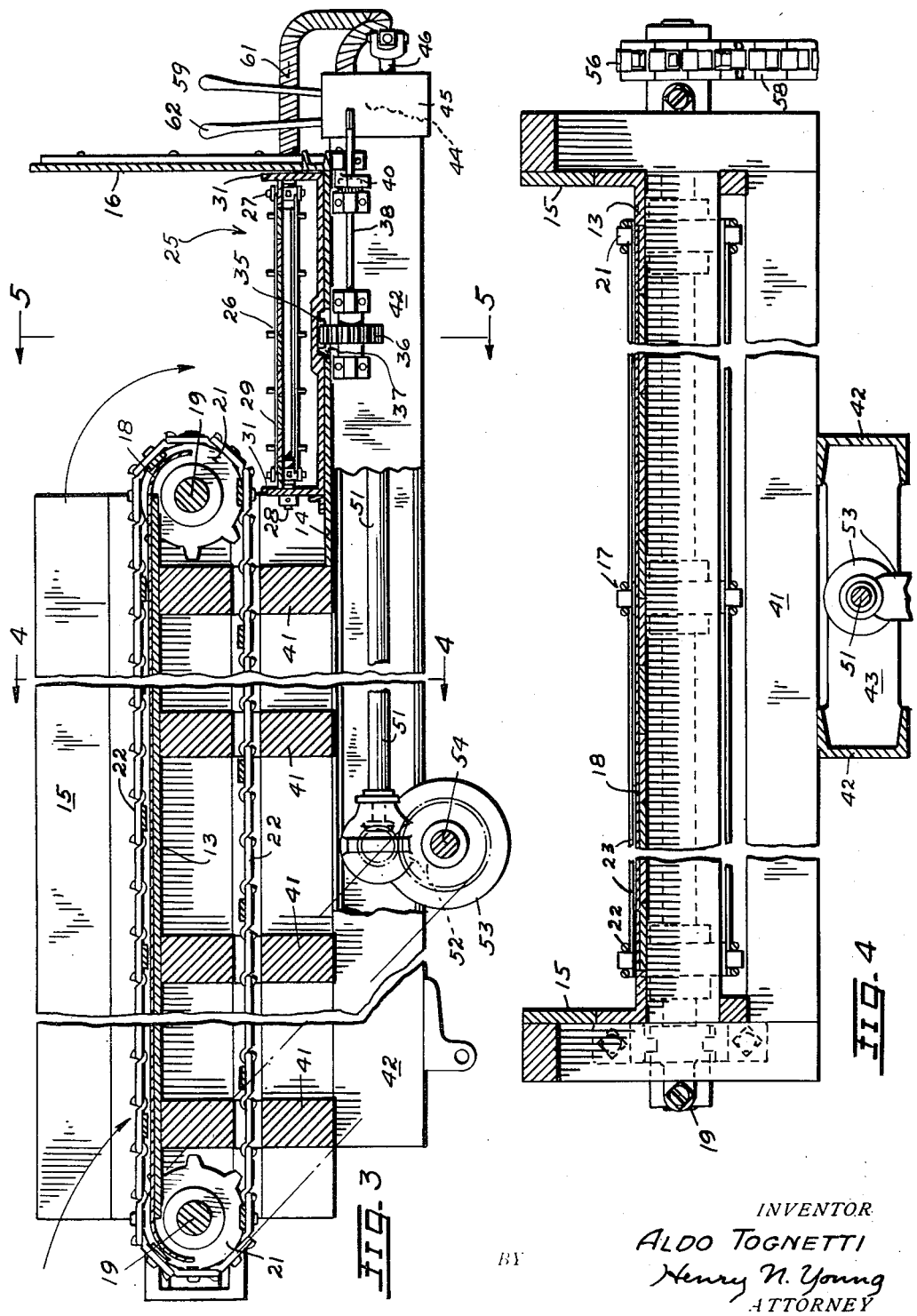
INVENTOR
ALDO TOGNETTI
Henry N. Young
ATTORNEY

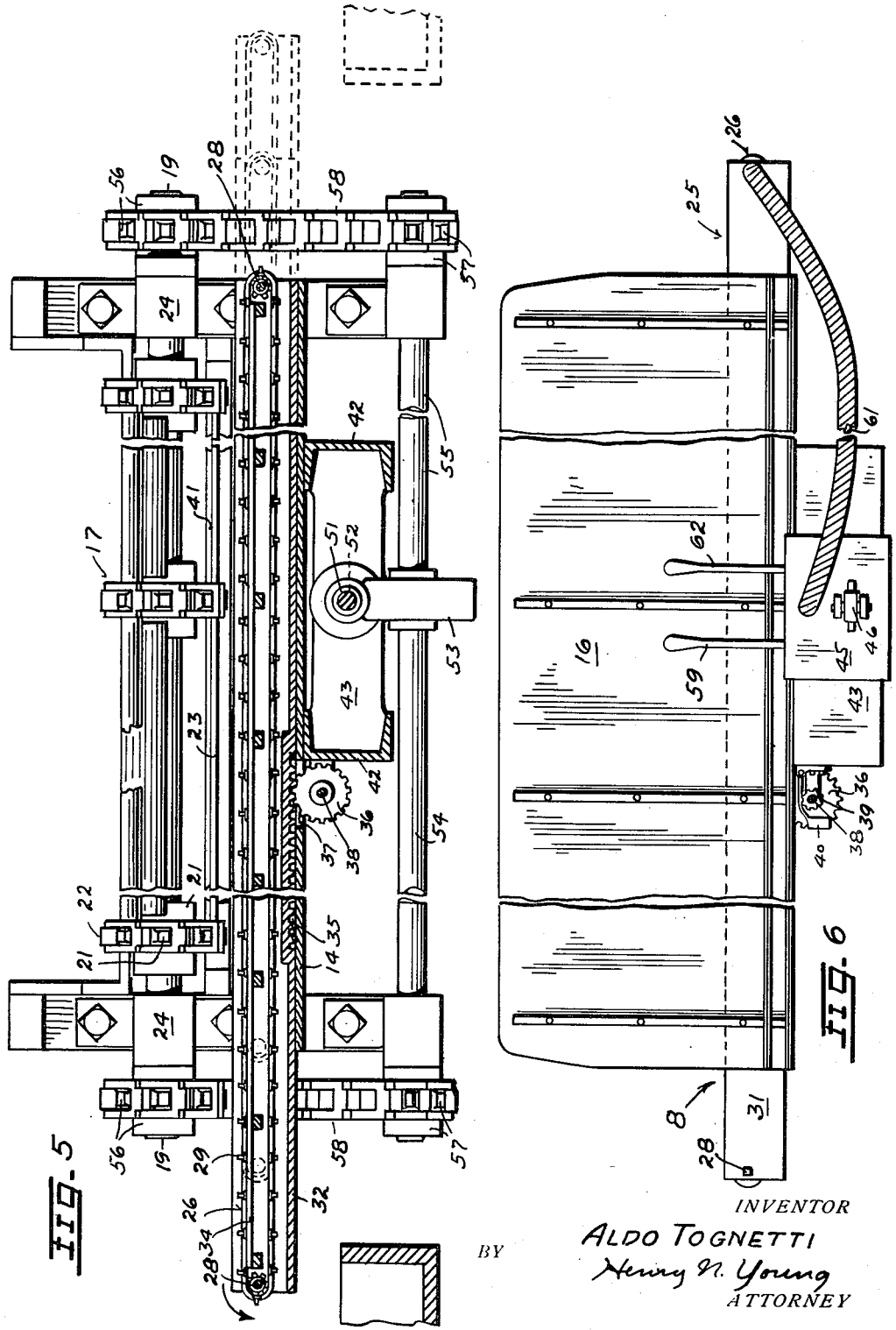

Patented June 8, 1943

2,321,168

UNITED STATES PATENT OFFICE 2,321,168

VEHICLE LOADING AND UNLOADING DEVICE

Aldo Tognetti, Monterey County, Calif.

Application March 12, 1941, Serial No. 382,870

5 Claims. (Cl. 214—83)

The invention relates to a vehicle for effecting the transfer of field crops and other loose materials from point to point.

An object of the invention is to provide a vehicle of the type described with improved load placement and unloading conveyor means.

Another object is to provide the vehicle with a cross-conveyor for use in discharging the load laterally of the vehicle and selectively at either side thereof.

A further object is to provide an improved drive for selectively actuating the distributing and discharge conveyors of the vehicle.

An added object is to provide for the actuation of the conveyors from the same tractor, or the like, which is used for moving the vehicle over the ground.

The invention possesses other objects and features of advantage, some of which, with the foregoing, will be set forth or be apparent in the following description of a typical embodiment of the invention, and in the accompanying drawings, in which, Figure 1 is an elevation of a vehicle embodying the invention and cooperatively installed between a propelling vehicle and an elevator unit for delivering material from the ground to the vehicle.

Figure 2 is an enlarged fragmentary plan view of the vehicle.

Figure 3 is a longitudinal section of the vehicle chassis taken on the line 3—3 in Figure 2.

Figures 4 and 5 are transverse sections respectively taken at the lines 4—4 and 5—5 in Figure 3.

Figure 6 is a front end elevation of the vehicle chassis.

As particularly illustrated, the features of present invention are embodied in the structure of a vehicle 7 have a bed or chassis 8 mounted on a suitable running gear which, in the present instance, is represented generally by supporting wheels 9. The vehicle 7 is shown as hitched to a towing tractor T by means of a draw-bar 11, and has a wheeled elevator unit E attached to its rear end by a draw-bar 12, for use to pick up and elevate material from the ground and discharge the material upon the adjacent end portion of the vehicle bed. The bed of the vehicle is of an open box type having a rearward bottom portion 13 and a lower forward bottom portion 14, side walls 15, and a front end wall 16.

The rearward bed bottom portion 14 extends for a major part of the bed length and has the upper portion of a continuous or endless conveyor 17 operative over its upper face longitudinally of the bed. The bed bottom portion over which the conveyor 17 is operative is preferably provided with a wear plate 18 which curves downwardly at its ends beneath the opposed conveyor portion. As particularly shown, shafts 19 are mounted beneath the opposite ends of the bed bottom portion 13, and mount a number of complementary pairs of sprocket wheels 21 on which continuous chains 22 are mounted. Cross-bars 23 connect corresponding links of the chains 22 along the conveyor 17 which thus comprises a ladder-like structure for movement over and upon the upper face of the wear plate 18 for moving the loaded material longitudinally over the vehicle bed. As particularly shown, the shafts 19 are journaled in suitable bearings 24 provided on the opposite side walls 15, said walls terminating at the front end of the conveyor 17.

The depressed bed bottom portion 14 supports an elongated cross-conveyor assembly 25, which assembly extends rearwardly from the front wall 16 of the bed to a point beneath the forward end of the conveyor 17 for gravitally receiving the conveyed material therefrom. The assembly 25 has an over-all length somewhat exceeding the width of the vehicle bed and generally comprises a continuous conveyor comprising chains 26 engaged about and between sets of sprockets 27 fixed on shafts 28 and connected by cross-cleats 29. The shafts 28 are journalled in and between upright side members 31 of the cross-conveyor frame, said members extending from a base 32 which fixedly connects them and slidably rests upon the bed bottom portion 14 in guided relation between the bottom of the front bed wall 16 and a guide flange 33 fixed to and across the bed portion 14. A plate 34 is fixed to and between the conveyor frame sides 31 just below the upper portions of the conveyor chains 26 for supporting the same and the material to be moved thereover by the cleats 29.

Intermediately thereof, the under face of the frame base 32 is provided with a rack 35 extending longitudinally of the base, and a gear 36 is operative through a slot 37 provided in the plate 32 for use in effecting longitudinal adjustments of the cross-conveyor assembly 25. As shown, the gear 36 is mounted on a shaft 38 journaled on a chassis member and arranged for turning by a crank. In this manner, and as indicated in Figure 5, the cross-conveyor assembly may be positioned to extend well beyond either side of the vehicle bed, or be centered with respect to the bed when not in use as a conveyor means.

Means are preferably provided for positively and releasably securing the cross-conveyor assembly 25 in adjusted position. As particularly shown, a toothed wheel 39 is fixed on the shaft 38 and is normally held against rotation in either possible direction by a gravity locking dog 40 pivoted to an adjacent chassis member and having its tooth operatively engageable between opposed teeth of the wheel 39. When the positioning of the cross-conveyor is to be changed, the dog 40 is raised by hand to permit an adjusting rotation of the shaft 38.

It will now be noted that the base portion of the chassis 8 beneath the longitudinal conveyer 17 comprises cross-beam members 41 supported on and across a frame comprising metallic longitudinal channel members 42 connected by metallic cross-members 43, while the bed bottom portion 14 rests directly upon the frame structure 42—43. The running gear for the vehicle is supportingly fixed to and beneath the frame 42—43, and essentially comprises the wheels 9 and their axles and the elements supporting the chassis from the axles, the front axle being turnable about an upright axis.

In the present instance, the driving of the distributing conveyor is arranged to be effected from the tractor T. Accordingly, a transmission gearing, which is indicated generally by the number 44, is provided in a housing 45 mounted on the forward cross-member 43, and is arranged to have its drive shaft 46 receive power from the tractor T through a drive shaft 47 connecting the shaft 46 with a power shaft 48 extending from the tractor, universal connections preferably being provided for the connecting shaft 47 as indicated. The transmission gearing 44 provides two power outlets from the shaft 46, one for the longitudinal conveyor 17 and the other for the cross-conveyor 25.

As is particularly brought out in Figures 2 and 3 and 5, a shaft 51 extends rearwardly from the transmission 44 to a connection with a differential gearing 52 provided in a housing 53 and arranged to actuate a pair of cross-shafts 54 and 55 having their outer ends journalled in bearings at the sides of the vehicle bed. Each of the shafts 19 which carry the conveyor sprockets 21 extends beyond the bed sides 15 at non-corresponding ends of the shafts, and their extending ends mount sprocket wheels 56. The shafts 54 and 55 carry sprocket wheels 57 in the planes of the different sprocket wheels 56 on the different shafts 19, and the pairs of coplanar sprocket wheels 56 and 57 thus provided mount drive chains 58 for actuating the front and rear conveyor shafts 19 together and differentially.

It will be understood that the differential gearing 52 of the present driving arrangement for the conveyor 17 provides for a pulling action from the advance end of the upper and load-engaging part of the conveyor whether the material thereon is being moved toward or from the front of the vehicle. The driving of the conveyor 17 in either direction is arranged to be effected by the appropriate setting of a gear shift lever 59 at the transmission 44, which lever is displaceable from a neutral position to provide driving connections for rotating the shaft 51 in either possible direction and, if desired, at different speeds; differential gearing for such a purpose is well-known in the art, and a detail showing thereof seems unnecessary.

A shaft 28 of the cross-conveyor 26 extends forwardly beyond the forward frame side 31 and is connected to the end of a flexible shaft 61 which is arranged for actuation as a driven shaft from the transmission gearing 44. The driving connections for the shaft 61 are controlled by a shift lever 62 extending from the transmission housing 45 and operative generally as the shift lever 59 for controlling the rotation of the shaft 51 in either direction and at different speeds. Through the provision of the flexible shaft 61, the cross-conveyor 26 may be actuated while disposed in its various adjusted positions with respect to the vehicle bed.

It is to be noted that the present vehicle is particularly valuable for use in the movement of cut or chopped field crops such as hay, beans, etc. from the field to another location. Elevators such as the elevator E may pick up the cut or chopped field crop material from the ground and deposit it at the end of the vehicle which is opposite the cross-conveyor assembly 25, and the deposited material may be moved longitudinally over the vehicle bed continuously or intermittently to provide room for the further deposits of the material until the loading of the bed is completed; this device is understood to eliminate the wasteful and expensive practice of moving the material forwardly along the bed by the use of pitch forks.

If the loaded material is to be distributed elsewhere on the ground, as in feeding hay in the field, the conveyor 17 may be reversed under the load to progressively discharge the loaded material from its rear end, with the vehicle either moving or static. On the other hand, the cross-conveyor 26 may discharge the material laterally from the vehicle and beyond the line of its wheels while the conveyor 17 progressively supplies it with the material. Discharge of the loaded material from the conveyor 26 may be effected in or along a trough while the vehicle is moving, or in the hopper of a gravity chute or elevator, as may be desired.

It is to be particularly noted that the mounting of the conveyor assembly 25 provides for the discharge of the conveyed material clear of and from either side of the vehicle to minimize the required maneuvering thereof with respect to a desired point or line of discharge. Normally, when unloading is to be effected by the cooperative action of the conveyors 17 and 25, the discharge end of the latter conveyor would be extended from the unloading side until its rear end is substantially aligned with the opposite side of the vehicle; this arrangement insures a delivery of all of the load material upon the conveyor 25 and is permitted by the fact that the effective conveyor length exceeds the width of the vehicle bed.

While the present vehicle 7 is shown and described as arranged for loading from the rear edge of its bed while it is moved over the ground, it will be understood that it might just as well be moved in a reverse direction with a suitable pick-up and elevating unit ahead of it; with the latter use of the vehicle, the cross-conveyor assembly 25 would be referred to as at the rear end of the vehicle bed.

It will be understood that the present vehicle is adapted for the distributed support of various loose non-crop materials, such as manure, upon the bed of the vehicle for discharging the load at a given point. Or, the material handled may comprise small articles or packages which are delivered by hand or chute upon the load-receiving end of the conveyor 17.

From the foregoing description, taken in connection with the accompanying drawings, the advantages of the construction and operation of the present device will be readily understood by those skilled in the art to which this invention appertains. While I have described the features and principles of operation of an assembly which I now consider to comprise a preferred embodiment of my invention, I desire to have it understood that the showing is primarily illustrative, and that such changes may be made, when desired, as fall within the scope of the following claims.

I claim:

1. In the load-supporting bed of a transfer vehicle; an endless chain conveyor having a load-engaging portion extending over the bed from an edge thereof and reversedly operative to distribute over the bed material deposited upon it adjacent said edge or to discharge the distributed material from said bed edge; sprocket-carrying shafts having their sprockets operatively engaging the extremities of the load-engaging conveyor portion for use in actuating the conveyor; and means to actuate said conveyor comprising a drive shaft, driven shafts, chain-and-sprocket connections between the driven shafts and said conveyor shafts, and a differential gearing connecting the drive shaft with the driven shafts.

2. In combination with the load-supporting bed of a transfer vehicle; a belt-type conveyor having a load-engaging portion extending over the bed from an edge thereof and reversedly operative to distribute over the bed material deposited upon it adjacent said edge or to discharge the distributed material from said bed edge; conveyor-actuating members operatively engaging the extremities of the load-engaging conveyor portion; and means to actuate said conveyor comprising a drive shaft, driven shafts, positive drive connections between the driven shafts and said conveyor actuating members, and a differential gearing connecting the drive shaft with the driven shafts.

3. In combination with the load-supporting bed of a transfer vehicle; a continuous conveyor extending over the bed from an edge thereof and reversedly operative to distribute over the bed material deposited upon it adjacent said edge or to discharge the distributed material from said bed edge; shafts carrying sprockets engaging the extremities of the load-engaging conveyor portion as a conveyor driving means thereat; and means to actuate said conveyor comprising a drive shaft, driven shafts, positive drive connections between the driven shafts and said conveyor shafts, and a differential gearing connecting the drive shaft with the driven shafts.

4. In a vehicular transfer unit; a draft vehicle having a power unit for propelling it and providing a power take-off; a transfer vehicle unitarily connected with the draft vehicle for its propulsion by the latter and providing a load-supporting bed for receiving material upon an edge portion thereof and having a conveyor extending over its said bed from the receiving edge thereof and actuatable to discharge the received material at either end thereof, a cross-conveyor having a length exceeding the width of the vehicle bed, a carriage for said cross-conveyor shiftable over the bed for its adjusted positioning to dispose either end of the conveyor in substantial alignment with a bed edge for the extension of its other end well beyond the opposite bed edge, a common drive shaft for the conveyors, and connections between the shaft and conveyors for selectively or jointly actuating the conveyors in either of the possible operative directions therefor; and means constantly connecting said common drive shaft with the said power take-off of the draft vehicle.

5. In a vehicular transfer unit; a draft vehicle having a power unit for propelling it and providing a power take-off; a transfer vehicle unitarily connected with the draft vehicle for its propulsion by the latter and providing a load-supporting bed for receiving material upon an edge portion thereof and having a conveyor extending over its said bed from the receiving edge thereof and actuatable to discharge the received material at either end thereof, a cross-conveyor carried by the transfer vehicle at an end of the first conveyor for receiving material from the latter, a carriage for said cross-conveyor shiftable with respect to the vehicle bed for its adjusted positioning to extend well beyond the adjacent bed edge while the unextended portion thereof is disposed to receive material discharge by the first conveyor, a common drive for the conveyors, and connections between the shaft and conveyors for selectively or jointly actuating the conveyors in either of the possible operative directions therefor; and means constantly connecting said common conveyor drive with the said power take-off of the draft vehicle.

ALDO TOGNETTI.